United States Patent [19]

Dahlgren

[11] Patent Number: 4,600,980
[45] Date of Patent: Jul. 15, 1986

[54] PORTABLE LIGHT SUPPORT APPARATUS

[75] Inventor: Douglas L. Dahlgren, Holdrege, Nebr.

[73] Assignee: Allmand Bros. Inc., Holdrege, Nebr.

[21] Appl. No.: 695,037

[22] Filed: Jan. 25, 1985

[51] Int. Cl.⁴ .............................................. F21V 21/22
[52] U.S. Cl. .................... 362/385; 362/386; 362/419
[58] Field of Search ............... 362/385, 386, 419, 272, 362/271, 286

[56] References Cited

U.S. PATENT DOCUMENTS

| | | | |
|---|---|---|---|
| 1,743,535 | 1/1930 | Edmondson | 362/419 |
| 1,827,797 | 10/1931 | Muller | 362/386 |
| 3,495,364 | 2/1970 | De Bella | 362/385 |
| 3,749,907 | 7/1973 | Allmand | 240/52 R |
| 3,958,376 | 5/1976 | Campbell | 52/115 |
| 4,300,186 | 11/1981 | Hurd | 362/385 |

Primary Examiner—Andrew M. Dolinar
Attorney, Agent, or Firm—Henderson & Sturm

[57] ABSTRACT

A portable light support apparatus having a telescoping mast unit. The apparatus includes a mast support unit (11) that provides a housing unit (14) for containing a generator unit and a hydraulic operating system, and a wheel assembly (16) and tongue unit (17) for facilitating portability of the housing unit (14). A telescoping mast unit (12) pivotally connects to the mast support unit (11) and provides for a vertical lock unit (32) and a safety lock unit (34) to prevent the apparatus from elongating unless in a vertical position. A rotating light bar (86) connects to the top of the telescoping mast unit (12) such that electric lights mounted thereon can be rotated from a remote position.

10 Claims, 4 Drawing Figures

PORTABLE LIGHT SUPPORT APPARATUS

TECHNICAL FIELD

This invention relates generally to portable light support structures having telescoping light supporting masts.

BACKGROUND ART

Lighting constitutes one of the earliest practical uses of generated electricity. And, from the earliest days of electric lighting, electric lights have been disposed on elevated structures to better illuminate a desired area. Street lighting and sports stadium lighting structures well represent this practice.

Occasionally, it may be necessary to provide electric lighting where no readily available source of electricity can be found, such as on a construction site. To meet this need, portable lighting structures having self-contained electrical generator means have been devised. In order to accommodate the portablity of these structures, many have a telescoping mast to allow the electric lights to be transported from place to place with a relatively small profile, and to allow the electric lights to be elevated to a desired height position once on location.

Many problems are left unresolved by such prior art apparatus. For instance, the telescoping masts themselves are relatively complex, and are subject to unnecessary wear in use. Further, once the mast has been fully elevated, the lights remain in a substantially fixed position and cannot be moved unless the lights are first lowered. Other problems include the required use of power to both raise and lower the mast and certain safety considerations. For instance, in some prior art structures, the mast may begin elongating before it has assumed a fully vertical position, or the mast may appear to be in a appropriate vertical position, but not be locked in place.

DISCLOSURE OF INVENTION

The above needs are substantially met by provision of the disclosed portable light support apparatus without undue compromise of desirable features already found in prior art structures. This portable light support apparatus includes a mast support unit, a telescoping mast unit and a rotating light bar unit.

The mast support unit includes a housing unit, a generator unit, a hydraulic operating system, a wheel assembly and a tongue unit. The generator unit provides electricity for the electric lights and for the hydraulic operating system. The hydraulic operating system provides hydraulic power to allow the telescoping mast unit to operate as desired. The housing unit encloses the generator unit and hydraulic operating system and may be moved about through use of the wheel assembly. Finally, the tongue unit provides an extension to allow the mast support unit to be towed.

The telescoping mast unit includes a primary and secondary support member, first and second hydraulic cylinders and a hydraulic cylinder mounting unit, first and second interface units, a vertical lock unit, a pivot unit and a safety lock unit. The primary and secondary support members each comprise hollow, square-shaped elongated members. The secondary support member can be slidably inserted into the primary support member.

The first and second hydraulic cylinders and the hydraulic cylinder mounting unit may be disposed within the primary and secondary support members. Hydraulic actuation of the two hydraulic cylinders cause the two cylinders to elongate, which action causes the primary and secondary support members to similarly elongate through interaction between these components and the first and second interface units.

The vertical lock unit assures that the various components comprising the mast will be locked in a vertical position. The pivot unit allows the mast structure to pivot with respect to the mast support unit. The safety lock unit assures that the mast may not become elongated until the mast has assumed its vertical position.

Finally, the rotating light bar unit comprises a light bar, and a rotation drive unit. The light bar itself rotatably mounts to the top of the telescoping mast unit. The rotation drive unit allows the light bar to be rotated with respect to the telescoping mast unit from a remote position.

As configured, the telescoping mast unit can be raised to a vertical position by the hydraulic operating system and locked in place through use of the vertical lock unit. Once in a vertical position, the safety lock unit will give way and allow the various components of the telescoping mast unit to become elongated upon proper operation of the hydraulic cylinders. Even when in a fully extended position, the light bar, and hence the electric lights attached thereto, can be rotated to illuminate a desired area through simple operation of the rotating light bar unit.

Through use of this apparatus, a portable light support apparatus can be provided that makes use of a relatively simple telescoping structure that minimizes wear upon its internal components. Once elevated, the lights can be remotely rotated in a very simple fashion. Further, as will become more apparent upon reviewing the following detailed description of the invention, no hydraulic power is necessarily required to cause the mast to become telescopically shortened. Other benefits obtained through use of this structure include safety improvements that include an assurance that the tower will be automatically locked in a vertical position and that the mast may not be elongated prior to assuming a substantially vertical position.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein.

BEST MODE FOR CARRYING OUT THE INVENTION

Figure 1:
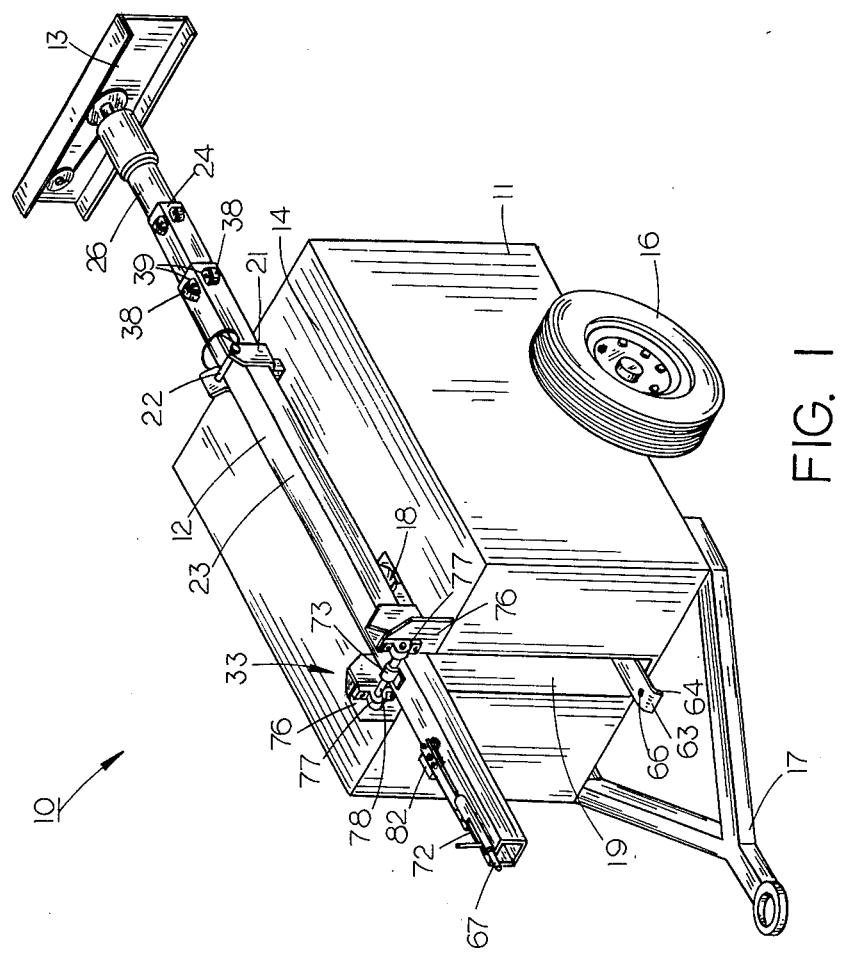
FIG. 1 comprises a perspective view of the apparatus.

Referring now to FIG. 1, the apparatus of the invention can be seen as generally depicted by the numeral 10. The apparatus (10) includes generally a mast support unit (11), a telescoping mast unit (12) and a rotating light bar unit (13). Each of these generally identified components will now be described in more detail in seriatim fashion.

MAST SUPPORT UNIT

The mast support unit (11) includes generally a housing unit (14), a wheel assembly (16), a tongue unit (17), a generator unit (not shown) and a hydraulic operating system (not shown).

The housing unit (14) comprises a typical portable light support apparatus housing and includes a floor and appropriate walls and cover for enclosing the generator unit and hydraulic operating system. The generator unit itself may be of any desired and appropriate type sufficient to provide the necessary amount of electricity to power the electric lights that will be supported by the apparatus (10) and to operate the hydraulic operating system.

The hydraulic operating system may similarly be comprised of a typical hydraulic operating system as used with such structures. The hydraulic operating system should include a hydraulic arm (18) for causing the telescoping mast unit (12) to assume a vertical position, and appropriate hydraulic connections to allow the hydraulic cylinders contained within the telescoping mast unit (12) (as described in more detail below) to elongate.

The wheel assembly (16) may be comprised of an axle, two of more wheels and other components, such as shock absorbers or the like, as may be desired. The tongue unit (17) may be comprised of a typical trailer tongue to facilitate attachment of the mast support unit (11) to a standard trailer hitch. So configured, the apparatus (10) may be conveniently towed from place to place.

The mast support unit (11) includes a cavity (19) formed in the forward side of the housing (14) to accommodate the telescoping mast unit (12) when in a vertical position. To assist in securing the telescoping mast unit (12) when in a horizontal position, a horizontal support bracket (21) may be secured to the upper side of the housing unit (14) near the rearward end thereof. The horizontal support bracket may be comprised of a U-shaped bracket of sufficient breadth to accommodate the telescoping mast unit (12). A lock bar (22) as well known in the prior art may be utilized to secure the telescoping mast unit (12) within the horizontal support bracket (21).

Most of the above components comprising the mast support unit (11) are generally well known and understood in the art, and hence, no more detailed description of these particular components need be provided.

TELESCOPING MAST UNIT

Figure 2:
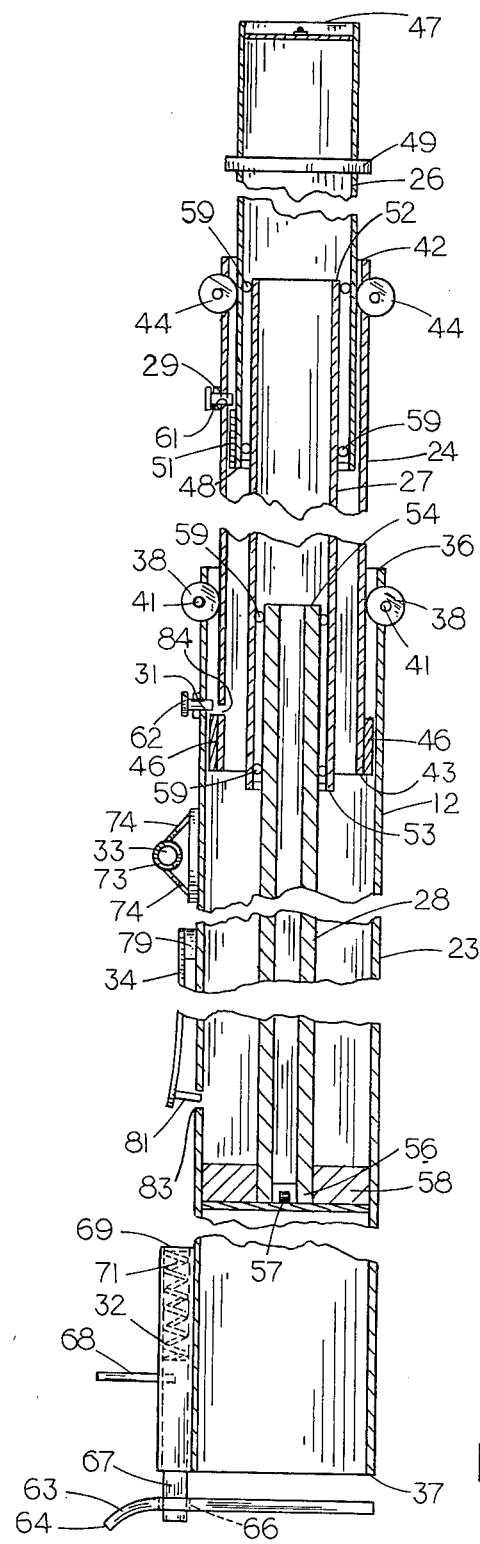
FIG. 2 comprises a side elevational enlarged sectioned view of the telescoping mast unit.

Referring to FIG. 2, the telescoping mast unit (12) includes generally a primary support member (23), a secondary support member (24), a first hydraulic cylinder (26), a second hydraulic cylinder (27), a hydraulic cylinder mounting unit (28), a first interface unit (29), a second interface unit (31), a vertical lock unit (32), a pivot unit (33) and a safety lock unit (34). Each of these generally described components will now be described in more detail.

The primary support member (23) may be comprised of a five inch square cylinder formed of steel or other appropriate material. The square cylinder forming the primary support member (23) has an open first end (36) and an open second end (37). Each side has a hole formed therethrough proximal the first end (36) for receiving a roller guide (38). As shown in FIG. 1, support flanges (39) are disposed on either side of the roller guides (38) on the exterior surface of the primary support member (23). Axles (41) can be centrally disposed through the roller guides (38) and the support flanges (39) to secure the roller guides (38) in place. The purpose of these roller guides (38) will become more clear below.

The secondary support member (24) may be comprised of a four inch square cylinder formed of steel or other appropriate material. The secondary support member (24) has an open first end (42) and an open second end (43).

As with the primary support member (23) the secondary support member (24) has roller guides (44) disposed on each of its walls proximal the first end (42) thereof. Again, the function of these roller guides (44) will be made more clear below.

The secondary support member (24) also has guide tabs (46) attached to each of its walls proximal its second end (43). These guide tabs (46) serve both to aid in guiding the secondary support member (24) within the primary support member (23), and to interact with the secondary attachment unit (31) as described below.

The first hydraulic cylinder (26) comprises a cylindrically shaped cylinder that may be received within the primary and secondary support members (23 and 24). The first hydraulic cylinder (26) has a closed first end (47) and an open second end (48).

A securement ring (49) may be disposed about the periphery of the first hydraulic cylinder (26) somewhat proximal the first end (47) thereof to facilitate securement of the rotating light bar unit (13) to the first hydraulic cylinder (26). The second end (48) of the first hydraulic cylinder (26) has a stop tab (51) affixed to one side thereof for interaction with the first attachment unit (29) as described in more detail below.

The second hydraulic cylinder (27) has a smaller cross section than the first hydraulic cylinder (26) and may be received within the latter. The second hydraulic cylinder (27) has an open first end (52) and an open second end (53).

The hydraulic cylinder mounting unit (28) comprises a cylinder having a smaller cross section than the second hydraulic cylinder (27) such that the hydraulic cylinder mounting unit (28) can be received within the second hydraulic cylinder (27). The first end (54) of the hydraulic cylinder mounting unit (28) may be open and the second end (56) connects to a hydraulic fluid inlet port (57). In addition, the second end (56) of the hydraulic cylinder mounting unit (28) connects to a base (58) that may be secured to the interior surface of the primary support member (23).

Hydraulic fluid seals (59) are provided as between the hydraulic cylinder mounting unit (28) and the interior surface of the second hydraulic cylinder (27), and as between the exterior surface of the second hydraulic cylinder (27) and the interior surface of the first hydraulic cylinder (26). So configured, hydraulic fluid may be introduced through the inlet port (57) provided in the base (58) of the hydraulic cylinder mounting unit (28) and thereafter be introduced into the interior of the hydraulic cylinder mounting unit (28), the second hydraulic cylinder (27) and the first hydraulic cylinder (26). Similarly, hydraulic fluid contained within the interior of any of these components can be removed through this same port (57).

The first interface unit (29) comprises a bolt that may be affixed to the exterior surface of the secondary support member (24) and that extends through a hole (61) provided therefor through the wall of the secondary support member (24). So disposed, the first interface unit (29) will not interfere with the sliding movement of the first hydraulic cylinder (26) until the bolt contacts and interacts with the stop tab (51) provided on the second end (48) of the first hydraulic cylinder (26).

The second interface unit (31) similarly comprises a bolt affixed to the exterior surface of the primary support member (23) proximal the first end (36) thereof. This bolt extends through a hole (62) provided therefor in the wall of the primary support member (23). As with the first interface unit (29), the second interface unit (31) does not interfere with movement of the secondary support member (24) until the guide tabs (46) provided on the exterior surface of the secondary support member (24) contact and interact with the second interface unit (31).

The vertical lock unit (32) includes a strike plate (63) that attaches to the housing (14) of the mast support unit (11). The strike plate includes an elongated member comprised of steel or some other appropriate material and having a downwardly curved forward end (64). A hole (66) is provided to receive a vertical lock pin (67).

The vertical lock pin (67) comprises a solid cylinder having a handle (68) perpendicularly attached thereto. The vertical lock pin (67) resides within a support sleeve (69) and may be biased outwardly by a spring (71). Finally, the support sleeve (69) has a slot (72) formed therethrough to allow the handle (68) to be moved. So configured, the vertical lock pin (67) will ordinarily be biased in an outward position, but can be moved inwardly by opposing the urging of the spring (71).

The pivot unit (33) includes a pivot bar guide (73) that secures to the exterior surface of the primary support member (23) through use of support bars (74). The pivot bar guide (73) comprises a tube suitable for receiving a pivot bar.

With reference to FIG. 1, the pivot unit (33) also includes two pivot support flanges (76) disposed on the housing (14) of the mast support unit (11) on either side of the cavity (19) provided for the telescoping mast unit (12). The pivot support flanges each have a pivot mount (77), such that a pivot bar (78) may be disposed through the pivot bar guide (73) and supported on either end by the pivot mounts (78).

It should be noted that the pivot bar guide (73) has been disposed on the upward and forward surface of the telescoping mast unit (12) and acts to bias the mast unit (12) toward the horizontal position.

Finally, the safety lock unit (34) comprises an elongated member having a first end (79) secured to the exterior surface of the primary support member (23) and a second end having a locking pin (81) attached perpendicularly thereto and further having a release tab (82) (FIG. 1) attached thereto. The safety lock unit (34) also provides for a hole (83) disposed through the wall of the primary support member (23) and another hole (84) disposed through the wall of the secondary support member (24).

When the secondary support member (24) and the first hydraulic cylinder (26) are fully collapsed within the primary support member (23), the lock pin (81) of the safety lock unit (34) may be disposed through the holes (83 and 84) provided and will further interact with the stop tab (51) attached to the first hydraulic cylinder (26). So disposed, the telescoping mast unit (12) cannot elongate.

ROTATING LIGHT BAR UNIT

Figure 3:
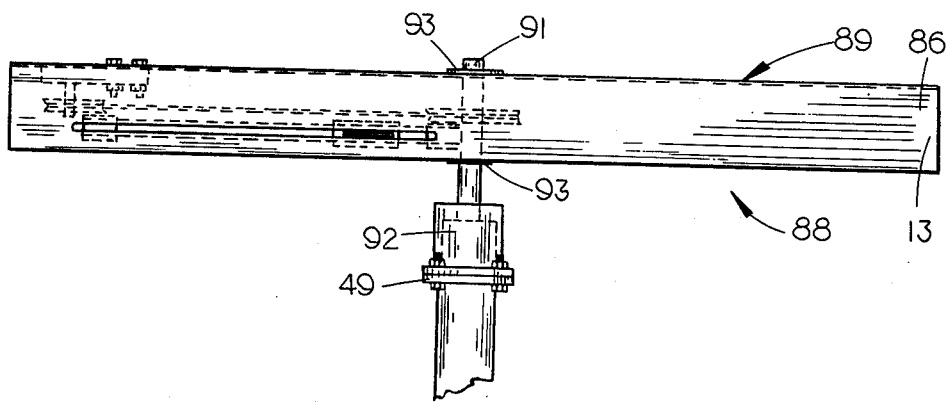
FIG. 3 comprises an enlarged front elevational view of the rotating light bar unit.
Figure 4:
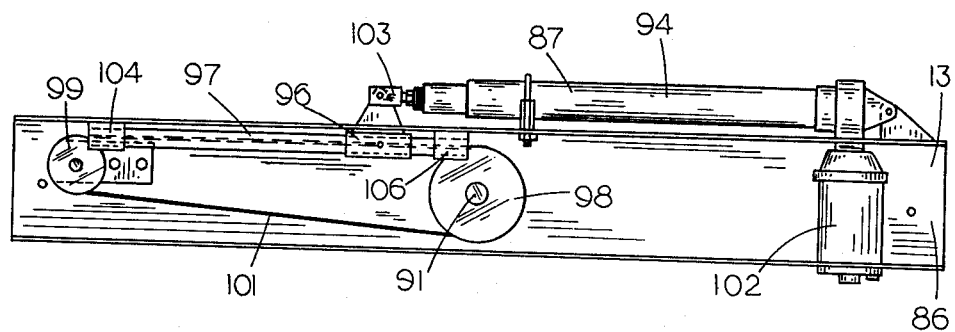
FIG. 4 comprises a top plan view of the rotating light bar unit.

Referring now to FIGS. 3 and 4, the rotating light bar unit (13) will be described. In general, the rotating light bar unit (13) comprises a light bar (86) and a rotating drive unit (87).

The light bar (86) comprises an elongated box-like member having an open lower surface (88) and a closed upper surface (89). A support shaft (91) that connects to the first hydraulic cylinder (26) through use of a connecting end cap (92) may be disposed through holes provided therefor in the light bar (86) and operably secured with respect to the bearing units (93). So configured, the light bar (86) can freely rotate about the support shaft (91).

The rotating drive unit (87) includes generally an actuator (94), a drive sleeve (96), a guide shaft (97), a master sprocket (98), an idler sprocket (99) and a drive chain (101). Each of these components will now be described in more detail.

The actuator unit (94) may be comprised of a Duff-Norton mini-pac electromechanical actuator having a built-in clutch. The motor (102) for the actuator can be mounted within the light bar (86), and the remaining structure of the actuator (94) can be mounted to the exterior side surface of the light bar (86). Such an actuator (94) has a drive screw operably contained therein that can cause a clevis (103) to be translated forwardly or rearwardly as desired.

The clevis (103) of the actuator unit (94) connects to the drive sleeve (96). The drive sleeve (96) constitutes a tube that fits about the guide shaft (97). The guide shaft (97) comprises an elongated member that attaches to the light bar (86) at both ends (104 and 106).

The master sprocket (98) comprises a thirty tooth sprocket that affixes to the support shaft (91). The idler sprocket (99) affixes with respect to the light bar (86) and may be moved back and forth somewhat to allow chain tension to be adjusted.

Finally, the drive chain (101) connects both sprockets (98 and 99) and further attaches to the drive sleeve (96). So configured, movement of the clevis (103) by controlled operation of the actuator unit (94) will cause the drive sleeve (96) to move along the guide shaft (97). Movement of the drive sleeve (96) will cause the drive chain (101) to move, and, since the master sprocket (98) is fixed with respect to the support shaft (91), this will cause the light bar (86) to rotate about the support shaft (91) and hence the telescoping mast unit (12).

The light bar (86) will support a variety of electric lights as desired. In addition, more than one light bar (86) can be utilized such that any appropriate and desired light supporting framework can be secured thereto.

OPERATION OF THE APPARATUS

Having described the components of the apparatus (10), the operation and use of the apparatus (10) will now be described. With reference to FIG. 1, the apparatus (10) can be towed to an appropriate site through use of the trailer tongue (17) and the wheel assembly (16). Once at a desired location, the mast support unit (11) can be separated from the towing vehicle. The lock bar (22) of the horizontal support bracket (21) should then be released to allow the telescoping mast unit (12) to assume a vertical position.

The generator unit in the mast support unit (11) should be activated to provide electricity for the hydraulic operating system. The hydraulic operating system may then be utilized to cause the hydraulic arm (18) to urge the telescoping mast unit (12) to a vertical position. It should be noted that until the telescoping mast unit (12) has assumed a vertical position, the safety lock unit (34) will prevent the telescoping mast unit (12) from prematurely elongating.

As the telescoping mast unit (12) assumes its vertical position, the vertical lock pin (67) will contact the strike plate (63) and become somewhat compressed. When the telescoping mast unit (12) has assumed a fully vertical position, the vertical lock pin (67) will be disposed above the hole (66) provided therefor in the strike plate (63) and will be urged therethrough by the spring (71). Therefore, the vertical lock unit (32) will cause the telescoping mast unit (12) to become automatically locked and secured once the telescoping mast unit (12) has assumed a fully vertical position.

In addition, when the telescoping mast unit (12) has assumed a fully vertical position, the safety lock unit (34) will be urged away from the telescoping mast unit (12) as the release tab (82) contacts the housing (14) of the mast support unit (11). This contact urges the locking pin (81) out of the holes (83 and 84) provided therefor such that elongation of the telescoping mast unit (12) can proceed uninhibited.

Once fully vertical, the hydraulic operating system can be operated to cause hydraulic fluid to enter through the port (57) provided in the hydraulic cylinder mounting unit (28). Such hydraulic fluid will urge the first hydraulic cylinder (26) upwardly. The first cylinder (26) will continue to rise until the first interface unit (29) contacts the stop flange (51) provided on the first hydraulic cylinder (26).

As the introduction of hydraulic fluid continues, the first hydraulic cylinder (26) will continue to rise and thereby cause the secondary support member (24) to rise as well due to the interaction of the first interface unit (29) between these two components. The first hydraulic cylinder (26) and the secondary support member (24) will therefor rise along with the second hydraulic cylinder (27). This elongation will continue until the second interface unit (31) interacts with the guide tabs (46) of the secondary support member (24), at which point elongation will cease.

The electric lights mounted on the light bar (86) can then be directed to illuminate a desired location by remotely controlling the actuator unit (94). As noted above, the actuator unit (94) will cause the light bar (86) to rotate about the telescoping mast unit (12).

When use of the apparatus (10) has been completed, the telescoping mast unit (12) can be caused to telescope inwardly through either a controlled removal of hydraulic fluid, or by simply allowing the hydraulic fluid to drain by gravity. Although the latter method will result in a slower return to a fully shortened position, this alternative means of lowering the telescoping mast unit (12) can allow for this reduction in size without the need to provide electric power or the like. Under some circumstances, this can be a desirable attribute.

Once in a fully shortened position, the handle (68) of the vertical lock unit (32) can be manipulated to remove the vertical lock pin (67) from interaction with the strike plate (63) such that the telescoping mast unit (12) can be placed in a horizontal position. Again, the lowering of the telescoping mast unit (12) to a horizontal position is facilitate through use of the hydraulic arm (18). This orientation allows for a non-powered controlled descent of the telescoping mast unit from a vertical position to a horizontal position.

The roller guides (38 and 44) are provided to ensure smooth and controlled movement of the various components of the telescoping mast unit (12) during elongation and contraction. It will be appreciated that this apparatus (10) may be utilized with minimal wear on the hydraulic components and through a minimal use of parts and materials. At the same time, a significant improvement in safety and convenience can be realized.

Obviously, numerous modifications and variations of the present invention are possible in light of the above teachings. It is therefore to be understood that within the scope of the appended claims the invention may be practised otherwise than as specifically described therein.

I claim:

1. A telescoping light support apparatus having a telescopic mast unit that can be selectively moved between a shortened position and an elongated position, comprising:

(a) a primary support member having a substantially hollow interior;

(b) a secondary support member having a substantially hollow interior and being insertable into and removable from said primary support member;

(c) a hydraulic cylinder mounting unit affixed at least partially within said primary support member;

(d) a second hydraulic cylinder slidably mounted about said hydraulic cylinder mounting unit;

(e) a first hydraulic cylinder slidably mounted about said second hydraulic cylinder;

(f) seal means for providing a fluid seal as between said first and second hydraulic cylinder and as between said first hydraulic cylinder and said hydraulic cylinder mounting unit;

(g) first interface means for operably affixing said secondary support member proximal its upper end to said hydraulic cylinder proximal its lower end during movement of said telescopic mast unit to said elongated position;

(h) second interface means for operably affixing said first support member proximal its upper end to said second support member proximal its lower end during movement of said telescopic mast unit to said elongated position to stop said movement; and (i) a rotating light bar unit including a light bar rotatably affixed to said telescopic mast unit for supporting at least one electric light, and a rotating drive means operably affixed to said light bar for remotely allowing said light bar to be selectively rotated with respect to said telescopic mast unit, said rotating drive means including an actuator unit operably affixed to said light bar, a drive sleeve operably connected to said actuator unit and being selectively extendable therefrom, a guide shaft affixed to said light bar and having said drive sleeve slidably disposed thereabout, a mast sprocket operably affixed with respect to said telescopic mast unit, an idler sprocket operably affixed with respect to said light bar; and a chain operably engaged about said mast sprocket and idler sprocket and being affixed to said drive sleeve, such that movement of said drive sleeve by said actuator unit will cause said light bar to rotate with respect to said telescopic mast unit.

2. The apparatus of claim 1 wherein said hydraulic cylinder mounting unit further includes a hydraulic fluid port for allowing hydraulic fluid to enter therethrough and to cause said second hydraulic cylinder to move away from said hydraulic cylinder mounting unit during movement of said telescopic mast unit to said elongated position.

3. The apparatus of claim 2 wherein said first interface means further operates to cause said second hydraulic cylinder to move said secondary support member when said second hydraulic cylinder moves away from said hydraulic cylinder mounting unit during movement of said telescopic mast unit to said elongated position.

4. The apparatus of claim 2 wherein said second interface means further operates to prevent said secondary support member from moving more than a predetermined distance away from said hydraulic cylinder mounting unit during movement of said telescopic mast unit to said elongated position.

5. The apparatus of claim 1 and further including:
(a) mast support means for supporting said telescopic mast unit; and
(b) a pivot unit mounted to a forward side of said primary support member for pivotally connecting said primary support member to said mast support means.

6. The apparatus of claim 1 and further including vertical lock means for selectively locking said telescopic mast unit in said shortened position.

7. The apparatus of claim 6 wherein:
(a) said primary support member has a hole disposed therethrough;
(b) said secondary support member has a hole disposed therethrough; and
(c) said vertical lock means includes a locking pin that may be disposed through said holes provided in said primary and secondary support members for preventing elongation of said telescopic mast unit.

8. The apparatus of claim 7 wherein:
(a) said apparatus further includes mast support means for supporting said telescopic mast unit; and
(b) said vertical lock means further includes a release tab operably affixed to said locking pin, said release tab being positioned to contact said mast support means when said telescopic mast unit is in a substantially vertical position such that contact between said release tab and said mast support means will cause said locking pin to be removed from interaction with said holes disposed through said primary and secondary support members.

9. The apparatus of claim 1 and further including:
(a) mast support means for supporting said telescopic mast unit; and
(b) safety lock means to lock said telescopic mast unit in a substantially vertical position.

10. The apparatus of claim 9 wherein said safety lock means further includes:
(a) a strike plate having a hole disposed therethrough and being operably affixed to said mast support means; and
(b) a vertical lock pin operably affixed to said telescopic mast unit and being biased towards a locking position; such that when said telescopic mast unit is in a substantially vertical position, said vertical lock pin will be biased into locking engagement with said hole disposed through said strike plate.

* * * * *